US010599208B2

(12) United States Patent
Nakatsuka et al.

(10) Patent No.: US 10,599,208 B2
(45) Date of Patent: Mar. 24, 2020

(54) MEMORY SYSTEM AND CONTROLLER

(71) Applicant: Toshiba Memory Corporation, Minato-ku (JP)

(72) Inventors: Hiroyasu Nakatsuka, Machida (JP); Mitsunori Tadokoro, Fujisawa (JP); Mitsuru Anazawa, Sagamihara (JP)

(73) Assignee: Toshiba Memory Corporation, Minato-ku (JP)

( * ) Notice: Subject to any disclaimer, the term of this patent is extended or adjusted under 35 U.S.C. 154(b) by 34 days.

(21) Appl. No.: 15/060,825

(22) Filed: Mar. 4, 2016

(65) Prior Publication Data

US 2017/0068478 A1 Mar. 9, 2017

Related U.S. Application Data

(60) Provisional application No. 62/215,528, filed on Sep. 8, 2015.

(51) Int. Cl.
*G06F 12/00* (2006.01)
*G06F 1/3287* (2019.01)
*G06F 12/02* (2006.01)
*G06F 1/3234* (2019.01)

(52) U.S. Cl.
CPC .......... *G06F 1/3287* (2013.01); *G06F 1/3275* (2013.01); *G06F 12/00* (2013.01); *G06F 12/0246* (2013.01); *G06F 2212/1032* (2013.01); *G06F 2212/7209* (2013.01); *Y02D 10/13* (2018.01)

(58) Field of Classification Search
None
See application file for complete search history.

(56) References Cited

U.S. PATENT DOCUMENTS

| 6,119,064 | A | * | 9/2000 | Nakaguro | ............ | G01R 31/007 701/115 |
| 7,240,144 | B2 | | 7/2007 | Tran et al. | | |
| 7,934,025 | B2 | | 4/2011 | Sapp et al. | | |
| 2002/0188852 | A1 | | 12/2002 | Masaki et al. | | |
| 2006/0075158 | A1 | * | 4/2006 | Hatakeyama | ........... | G06F 13/28 710/22 |
| 2007/0226457 | A1 | * | 9/2007 | Moore | ...................... | G06F 1/32 712/10 |
| 2008/0177909 | A1 | * | 7/2008 | Sapp | ....................... | G06F 13/28 710/27 |
| 2009/0164817 | A1 | * | 6/2009 | Axford | ................. | G06F 1/3203 713/322 |

(Continued)

FOREIGN PATENT DOCUMENTS

| JP | 2003-36206 | 2/2003 |
| JP | 2005-293596 | 10/2005 |
| JP | 2008-41036 | 2/2008 |

*Primary Examiner* — Baboucarr Faal
(74) *Attorney, Agent, or Firm* — Oblon, McClelland, Maier & Neustadt, L.L.P.

(57) ABSTRACT

According to one embodiment, a memory system includes a nonvolatile memory and a controller. The controller executes access to the nonvolatile memory based on a command from a host device. The controller includes a processor, a data memory and a monitoring circuit. The monitoring circuit monitors writing to the data memory by a certain processing circuit in the controller and transmits a first notification to the processor when receiving the writing.

18 Claims, 9 Drawing Sheets

(56) References Cited

U.S. PATENT DOCUMENTS

| | | | |
|---|---|---|---|
| 2009/0201935 A1* | 8/2009 | Hass | G06F 9/30054 |
| | | | 370/395.32 |
| 2009/0307714 A1* | 12/2009 | Hoover | H04L 45/00 |
| | | | 719/314 |
| 2010/0075158 A1* | 3/2010 | Katayama | C08G 77/58 |
| | | | 428/447 |
| 2010/0205379 A1* | 8/2010 | Auernhammer | G06F 9/52 |
| | | | 711/146 |
| 2010/0274933 A1* | 10/2010 | Wang | G06F 3/0625 |
| | | | 710/22 |
| 2015/0052329 A1* | 2/2015 | Fujinami | G06F 12/1027 |
| | | | 711/207 |
| 2015/0317084 A1* | 11/2015 | Hwang | G06F 3/064 |
| | | | 711/154 |
| 2016/0041773 A1* | 2/2016 | Phan | G06F 12/0246 |
| | | | 711/103 |
| 2016/0041791 A1* | 2/2016 | Hwang | G06F 3/0604 |
| | | | 711/154 |
| 2017/0031632 A1* | 2/2017 | Yun | G06F 3/0659 |

* cited by examiner

MEMORY SYSTEM AND CONTROLLER

CROSS-REFERENCE TO RELATED APPLICATIONS

This application claims the benefit of U.S. Provisional Application No. 62/215,528, filed Sep. 8, 2015, the entire contents of which are incorporated herein by reference.

FIELD

Embodiments described herein relate generally to a memory system and a controller.

BACKGROUND

In recent years, memory systems provided with a nonvolatile memory have become widespread. As one of such memory system, a solid-state drive (SSD) provided with a NAND flash memory is known. SSDs are used as main storage in various information processing apparatuses.

In an SSD, a controller for managing comprehensive control of constituent elements, more specifically, a controller in charge of control for writing data to a NAND flash memory or reading data from the NAND flash memory based on a request from a host device is incorporated. In order to further improve the performance of the SSD, performance improvement of the controller is required.

DETAILED DESCRIPTION

In general, according to one embodiment, a memory system includes a nonvolatile memory and a controller. The controller executes access to the nonvolatile memory based on a command from a host device. The controller includes a processor, a data memory and a monitoring circuit. The monitoring circuit monitors writing to the data memory by a certain processing circuit in the controller and transmits a first notification to the processor when receiving the writing.

First Embodiment

First, a first embodiment will be described.

Figure 1:
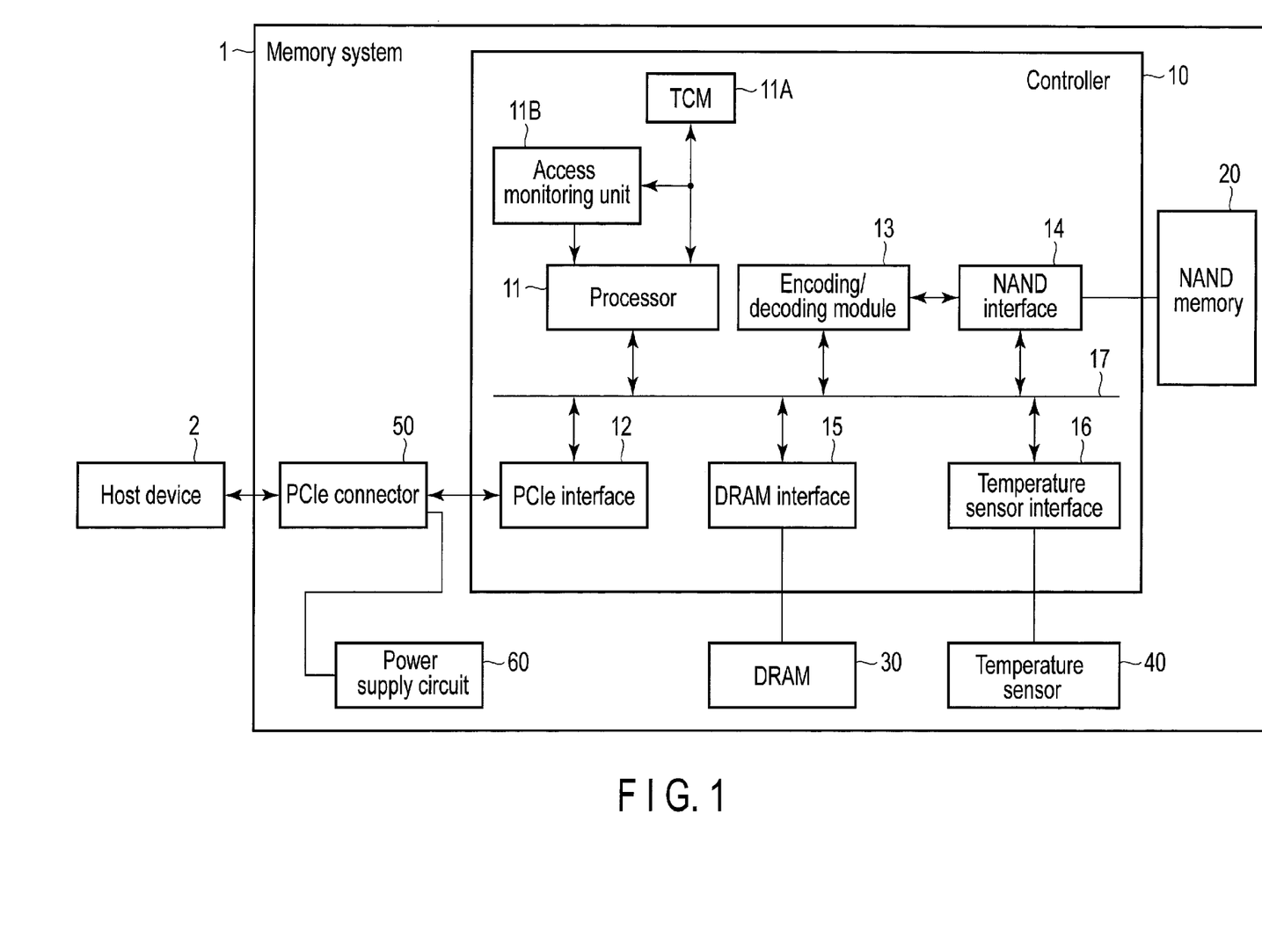
FIG. 1 is a view showing an example of a configuration of a memory system of a first embodiment.

FIG. 1 is a view showing an example of a configuration of a memory system 1 of the embodiment. The memory system 1 is a storage device configured to write data to a nonvolatile memory, and read data from the nonvolatile memory. The memory system 1 is realized as an SSD provided with a NAND flash memory (hereinafter referred to as a NAND memory). Here, although a case where a NAND memory is used as a nonvolatile memory is described, a nonvolatile semiconductor memory other than the NAND memory such as a three-dimensional flash memory, a resistive random access memory (ReRAM), a ferroelectric random access memory (FeRAM), and the like may also be used. Further, although an SSD is assumed as the memory system 1 of the embodiment, other storage devices such as a hard disk drive (HDD), a hybrid disk drive, a SD card, a flash drive, a magnetic tape, and the like may also be used.

The memory system 1 is used as an external storage device of a host device 2. The host device 2 may be an information processing apparatus such as a personal computer, a server, and the like, a mobile telephone, and an imaging device or may be a mobile terminal such as a tablet computer, a smartphone, and the like or may be a game machine or may be an on-vehicle terminal such as a car navigation system, and the like.

As an interface for interconnecting the memory system 1 and the host device 2, for example, PCI Express (PCIe) can be used. Here, although PCIe is assumed as the interface, other interfaces such as Advanced Technology Attachment (ATA), Serial Advanced Technology Attachment (SATA), Universal Serial Bus (USB), Serial Attached SCSI (SAS), and the like may also be used.

As shown in FIG. 1, the memory system 1 includes a controller 10, a NAND memory 20, a DRAM 30, a temperature sensor 40, a PCIe connector 50, a power supply circuit 60, and the like.

The controller 10 controls constituent elements of the memory system 1 in a superintending manner. Upon receipt of a command from the host device 2 through the PCIe connector 50, the controller 10 carries out control in accordance with the command. The controller 10 includes a processor 11, a tight coupled memory (TCM) 11A, an access monitoring unit 11B, a PCIe interface 12, an encoding/decoding module 13, a NAND interface 14, a DRAM interface 15, a temperature sensor interface 16, and the like to be described later. The processor 11, the PCIe interface 12, the encoding/decoding module 13, the NAND interface 14, the DRAM interface 15, and the temperature sensor interface 16 are interconnected through a bus 17.

The NAND memory 20 includes one or more memory chips each including memory cell arrays. The memory cell array includes a plurality of memory cells arranged in a matrix form. The memory cell array includes a plurality of blocks each of which constitutes a unit of data erasure. Each block is constituted of a plurality of physical sectors.

Figure 2:
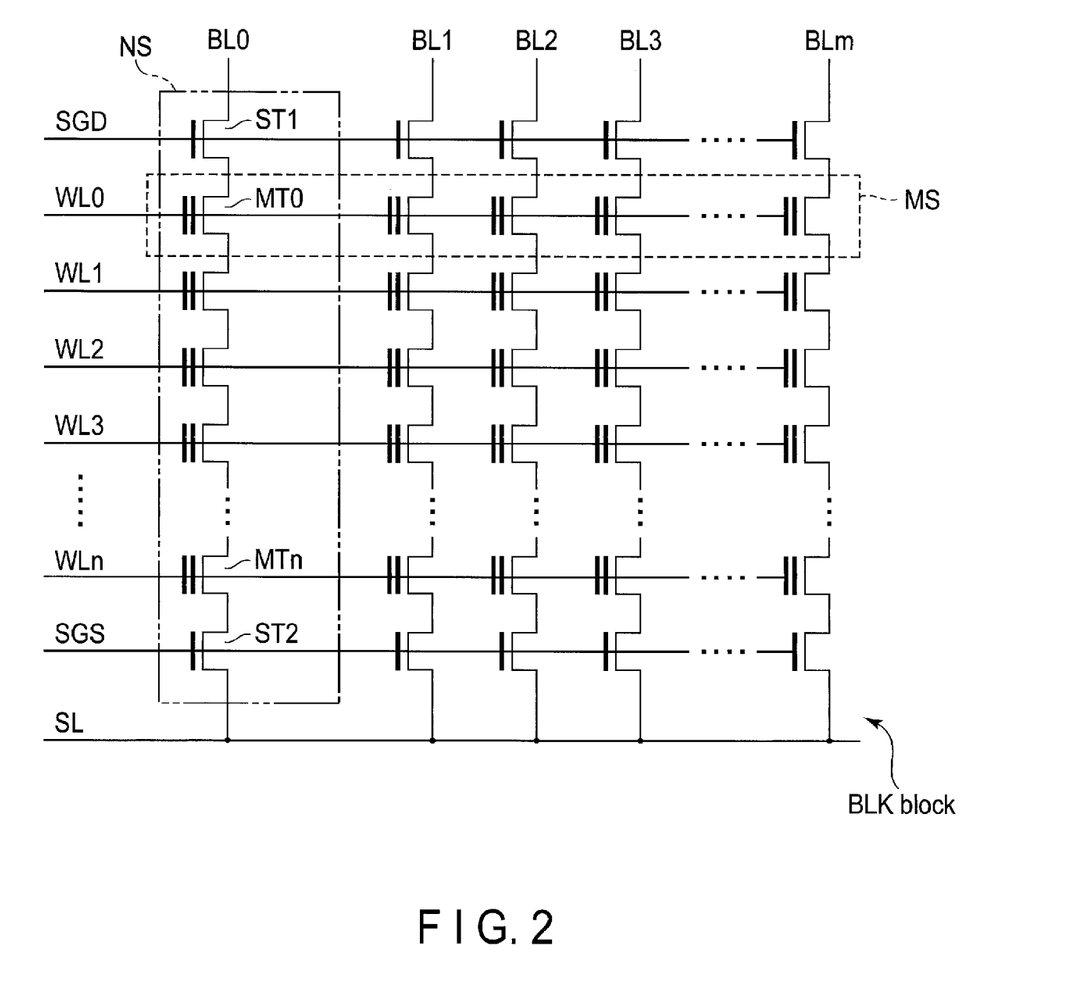
FIG. 2 is a view showing a configuration example of a block of a memory cell array.

FIG. 2 is a view showing a configuration example of a block of a memory cell array. FIG. 2 shows one block among the plurality of blocks constituting the memory cell array. Each of other blocks of the memory cell array has a configuration identical to FIG. 2. As shown in FIG. 2, the block BLK of the memory cell array include m+1 (m is an integer greater than or equal to zero) NAND strings NS. Each of the NAND strings NS includes n+1 (n is an integer greater than or equal to zero) memory cell transistors MT0 to MTn which are connected in series in such a manner that a diffusion region (a source region or a drain region) is shared by adjacent memory cell transistors MT, and select transistors ST1 and ST2 which are arranged at both ends of the column of the n+1 memory cell transistors MT0 to MTn.

Each of word lines WL0 to WLn is connected to a control gate electrode of each of the memory cell transistors MT0 to MTn each constituting the NAND strings NS, and memory cell transistors MTi (i=0 to n) in the NAND strings NS are connected to each other by the same word line WLi (i=0 to n) as a common connection. That is, in the block BLK, control gate electrodes of memory cell transistors MTi in the same row are connected to the same word line WLi.

Each of the memory cell transistors MT0 to MTn is constituted of a field-effect transistor having a stacked gate structure formed on a semiconductor substrate. Here, a charge storage layer (floating gate electrode) formed on the semiconductor substrate with a gate insulator film interposed between them, and a control gate electrode formed on the charge storage layer with an inter-gate insulating film interposed between them are included in the stacked gate structure. In each of the memory cell transistors MT0 to MTn, a threshold voltage changes in accordance with the number of electrons stored in the floating gate electrode, and data can be stored in accordance with a variation in the threshold voltage.

Each of bit lines BL0 to BLm is connected to each of drains of m+1 select transistors ST1 in one block BLK, and a select gate line SGD is connected to gates of select transistors ST1 as a common connection. Further, a source of each of select transistors ST1 is connected to a drain of each of the memory cell transistors MT0. Likewise, a source line SL is connected to sources of m+1 select transistors ST2 in the one block BLK as a common connection, and a select gate line SGS is connected to gates of select transistors ST2 as a common connection. Further, a drain of each of select transistors ST2 is connected to a source of each of the memory cell transistors MTn.

Each of the memory cells is connected to a word line, and is also connected to a bit line. Each of the memory cells can be recognized from an address recognizing a word line, and address recognizing a bit line. As described above, data items in the plurality of memory cells (memory cell transistors MT) in the same block BLK are collectively erased. On the other hand, reading and writing are carried out in units of pages. When each of the memory cells can store therein binary data only, one page corresponds to one physical sector MS including a plurality of memory cells connected to one word line.

When each of the memory cells can store therein multi-level data, if the memory cell is operated in a single-level cell (SLC) mode, one physical sector MS corresponds to one page. When the memory cell is operated in a multilevel cell (MLC) mode, one physical sector MS corresponds to N pages (N is a natural number greater than or equal to 2). When N is 2 (N=2), one physical sector MS corresponds to two pages, and when N is 3 (N=3), one physical sector MS corresponds to three pages.

At the time of a read operation or a program operation, one word line is selected and one physical sector MS is selected in accordance with a physical address. Switching of pages in the physical sector MS is carried out based on the physical address.

The NAND memory 20 including one or more memory chips each of which includes a memory cell array including a plurality of blocks each having such configurations is connected to the NAND interface 14 of the controller 10.

The DRAM 30 functions as a buffer used to transfer write data and read data between the host device 2 and NAND memory 20, and also functions as a storage area of various management table data items (hereinafter referred to as management data items). The management data is data to be utilized to control transfer of write data and read data between the host device 2 and NAND memory 20. The management data includes mapping information indicating a relationship between a logical address designated by the host device 2, and storage position (physical address) on the NAND memory 20. The memory system 1 may include, in place of the DRAM 30, a static random access memory (SRAM), a magnetoresistive random access memory (MRAM), or a ferroelectric random access memory (Fe-RAM). The DRAM 30 is connected to the DRAM interface 15 of the controller 10.

The temperature sensor 40 detects a temperature in the memory system 1, for example, in the vicinity of the controller 10 or in the vicinity of the NAND memory 20. The temperature detected by the temperature sensor 40 is used, for example, to monitor whether or not the temperature in the memory system 1 is within the recommended operating temperature range. The temperature sensor 40 is connected to the temperature sensor interface 16 of the controller 10.

The PCIe connector 50 is a coupling unit for connecting the host device 2 and memory system 1 to each other. The PCIe connector 50 is connected to the PCIe interface 12 of the controller 10. A read command, a write command, user data, and the like from the host device are received by the PCIe interface 12 through the PCIe connector 50. Further, user data read from the NAND memory 20, a response from the controller 10, and the like are transmitted to the host device through the PCIe connector 50. In the PCIe connector 50, the shape and the like thereof are specified to conform to the PCIe standard. As described previously, although the PCIe interface is used as the interface here, other interfaces such as ATA, SATA, USB, SAS, and the like may also be used. In such a case, their shapes are specified to conform to the corresponding standards.

The power supply circuit 60 is connected to the host device 2 through the PCIe connector 50, and receives power supply from the host device through the PCIe connector 50. The power supply circuit 60 is also connected to the controller 10, the NAND memory 20, and the DRAM 30 through a power-supply line not shown in FIG. 1, and can supply the power supplied from the host device 2 to the controller 10, the NAND memory 20, and the DRAM 30.

Subsequently, the processor 11, the TCM 11A, the access monitoring unit 11B, the PCIe interface 12, the encoding/decoding module 13, the NAND interface 14, the DRAM interface 15, and the temperature sensor interface 16 which are included in the controller 10 will be described below.

At the time of startup of the memory system 1, firmware preserved in the NAND memory 20 or in the other non-volatile memory (not shown in FIG. 1) in the memory system 1 is loaded into a memory (not shown in FIG. 1) in the controller 10. The processor 11 executes predetermined processing in accordance with the firmware. It is sufficient if the processor 11 can carry out the predetermined processing according to the firmware, and the processor 11 is, for example, a central processing unit (CPU). For example, the processor 11 carries out read processing from the NAND memory 20 in accordance with a read command notified thereto by the PCIe interface 12. The processor 11 acquires a physical position on the NAND memory 20 corresponding to a logical address of read data from management data stored in the DRAM 30, and notifies the NAND interface 14 of the acquired physical position to thereby execute the read processing. The processor 11 utilizes the DRAM 30 as a buffer of the data which has been read. The data which has been read is transmitted to the host device 2 through the encoding/decoding module 13 (decoding module), the DRAM 30, and the PCIe interface 12.

Further, the processor 11 carries out write processing to the NAND memory 20 in accordance with a write command which has been notified thereto by the PCIe interface 12. The processor 11 writes a code word created by the encoding/decoding module 13 (encoding module) to the NAND memory 20. The processor 11 utilizes the DRAM 30 as a buffer of data to be written. Further, the processor 11 registers a logical address of the written data, and mapping information about a physical position on the NAND memory 20 in the management data stored in the DRAM 30.

In the memory system 1 of the embodiment, the controller 10 includes a memory which is tightly coupled to the processor 11, and can be accessed with low latency, i.e., the TCM 11A. To the TCM 11A, for example, data required by the processor 11, a flag indicating completion of preparation of the data, and the like are written by the DRAM interface 15 or the like. Besides, in the memory system 1 of the embodiment, the controller further includes the access monitoring unit 11B which monitors writing to the TCM 11A carried out by, for example, the DRAM interface 15 or the like. Relationships or the like between the processor 11, the TCM 11A, and the access monitoring unit 11B will be described later.

The PCIe interface 12 executes communication for delivery of a read command, write command, user data, responses to the commands, and the like from/to the host device 2 to/from the controller 10, more specifically, to/from the processor 11, the host device 2 and the controller 10 being connected to each other through the PCIe connector 50.

The encoding/decoding module 13 firstly encodes user data buffered in the DRAM 30 to thereby create a code word constituted of data and a redundant part (parity) (encoding section). Further, the encoding/decoding module 13 secondly acquires a code word read from the NAND memory 20 from the NAND interface 14, and decodes the acquired code word (decoding section). Upon failure in error correction at the time of decoding, the encoding/decoding module 13 notifies the processor 11 of a read error.

The NAND interface 14 directly controls writing to the NAND memory 20, and reading from the NAND memory 20 based on a command from the processor 11. The DRAM interface 15 directly controls writing to the DRAM 30 and reading from the DRAM 30 based on a command from the processor 11. The temperature sensor interface 16 directly controls reading (temperature information) from the temperature sensor 40 based on a command from the processor 11.

Next, relationships between the processor 11, the TCM 11A, and the access monitoring unit 11B in the controller 10 of the memory system 1 having the above-mentioned configuration will be described below with reference to FIG. 3 and FIG. 4.

Figure 3:
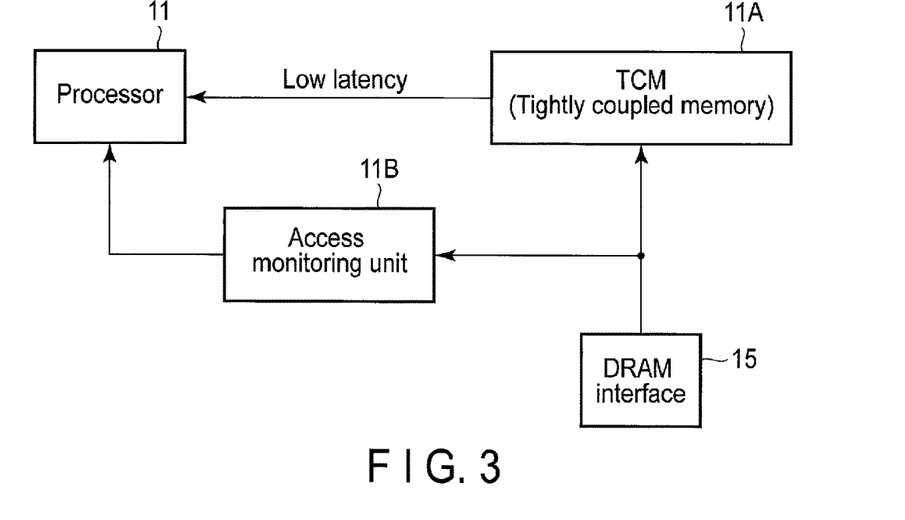
FIG. 3 is a view for explaining relationships between a processor, TCM, and access monitoring unit in a controller of the memory system of the first embodiment.

As shown in FIG. 3, the access monitoring unit 11B monitors writing to the TCM 11A carried out by the DRAM interface 15. The access monitoring unit 11B is configured to execute predetermined processing of notification to the processor 11 when the monitoring unit 11B detects the write. Here, although the DRAM interface 15 is assumed as the to-be-monitored object of the access monitoring unit 11B, other intellectual property (IP) cores in the controller 10 such as the NAND interface 14, temperature sensor interface 16, and the like may also be made the object to be monitored. That is, the access monitoring unit 11B monitors writing to the TCM 11A carried out by a predetermined processing circuit (certain processing circuit) in the controller 10.

Upon receipt of a notification from the access monitoring unit 11B, the processor 11 executes processing using the data written by the DRAM interface 15. As described previously, to the processor 11, for example, a CPU which executes predetermined processing in accordance with firmware. It should be noted that in FIG. 3 and FIG. 4, although the DRAM interface 15 and the TCM 11A are directly connected to each other by a line segment for easy understanding, the TCM 11A is a memory tightly coupled to the processor 11, and hence data transfer from the DRAM interface 15 to the TCM 11A is carried out by way of the processor 11. However, the communication path in the processor 11 leading from the bus 17 to the TCM 11A is left open, and the processor 11 is not concerned with writing to the TCM 11A to be carried out by the DRAM interface 15. Data to be transferred from the DRAM interface 15 or the like to the TCM 11A is also called a message in the following description.

A cooperative operation between the processor 11 and the access monitoring unit 11B concomitant with the writing to the TCM 11A carried out by the DRAM interface 15 will be described below with reference to FIG. 4.

It is assumed that the processor 11 has issued some command to the DRAM interface 15 for the purpose of carrying out certain processing and, thereafter, the processor 11 is in one of a state (a) where the processor 11 is executing some other processing until a response to the command is obtained from the DRAM interface 15, and a state (b) where no other processing to be carried is found, and hence the processor 11 has shifted to the power-saving mode owing to a pipeline stall. In the power-saving mode, part of or all of the functions of the processor 11 stop in order to suppress power consumption. The reason why the processor 11 which has issued some command to the DRAM interface 15 can be brought into the above-mentioned state (a) or the state (b) will be described later.

Figure 4:
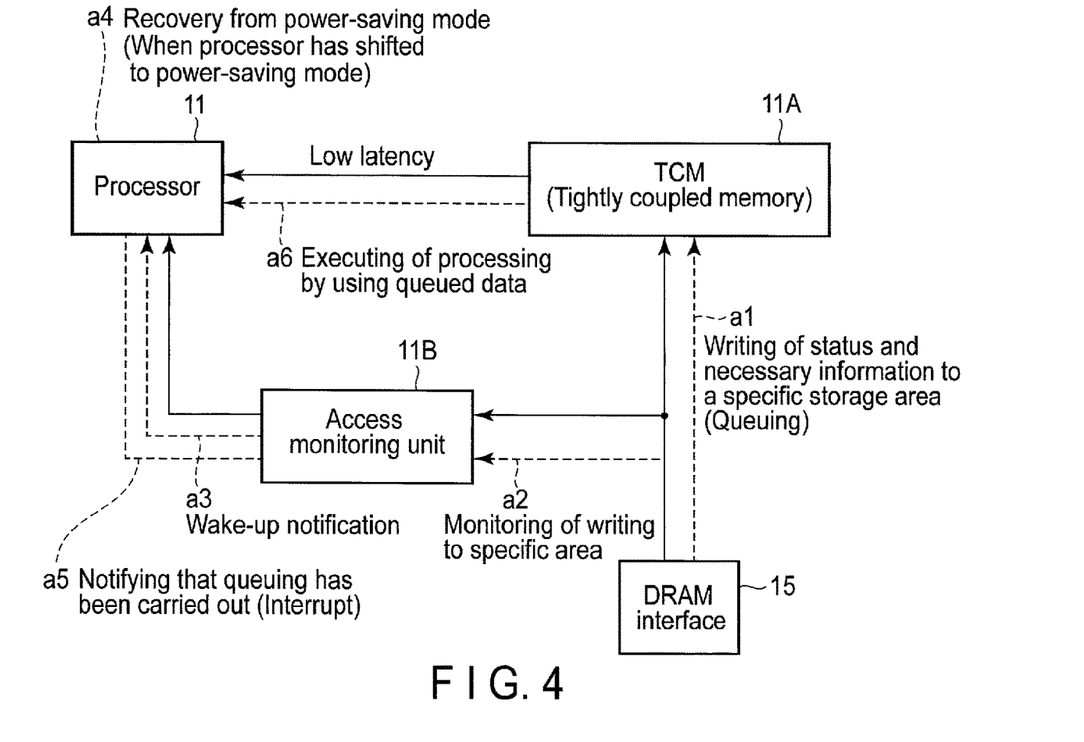
FIG. 4 is a view for explaining a cooperative operation between the processor and access monitoring unit in the controller of the memory system of the first embodiment.

The DRAM interface 15 writes a response (data necessary for the processor 11 to execute the processing, and a completion flag) to this command to a predetermined area of the TCM 11A (a1 in FIG. 4). In other words, the DRAM interface 15 executes transfer of data addressed to the predetermined address (certain address) indicating the predetermined area of the TCM 11A. The access monitoring unit 11B monitors writing to the predetermined area of the TCM 11A, i.e., writing to the TCM 11A carried out by the DRAM interface 15 based on the predetermined address (particularly, an address indicating an area to which a completion flag is to be written) (a2 in FIG. 4).

Upon detection of writing to the TCM 11A carried out by the DRAM interface 15, the access monitoring unit 11B firstly carries out notification (first notification) for recovering the processor 11 from the power-saving mode to the normal mode to the processor 11 (a3 in FIG. 4). The access monitoring unit 11B may carry out this notification irrespective of whether or not the processor 11 has already been shifted to the power-saving mode. The processor 11 which has received this notification recovers from the power-saving mode to the normal mode when the processor 11 has already shifted to the power-saving mode (a4 in FIG. 4). When the processor 11 has not shifted to the power-saving mode, it is sufficient if the processor 11 ignores the notification.

Further, the access monitoring unit 11B carries out notification (second notification) for notifying that a response to the above-mentioned command has been written to the TCM 11A to the processor 11 (a5 in FIG. 4). The processor 11 which has received this notification executes processing using the response to the above command, the response being written to the TCM 11A (a6 in FIG. 4). It should be noted that this notification may be carried out approximately at the same time as the aforementioned notification for recovering the processor 11 from the power-saving mode to the normal mode is carried out. For example, when a predetermined I/O port of the processor 11 is assigned for the notification in question, and an input value to the I/O port is switched from, for example, 0 to 1, whereby the processor 11 is notified that a response to the above command has been written to the TCM 11A, even if the notification in question is carried out in a state where the processor 11 has already shifted to the power-saving mode, the processor 11 which has recovered from the power-saving mode to the normal mode can execute the processing using the response to the above command, the response being written to the TCM 11A, based on the fact that the input value to this I/O port has been switched to 1.

Figure 5:
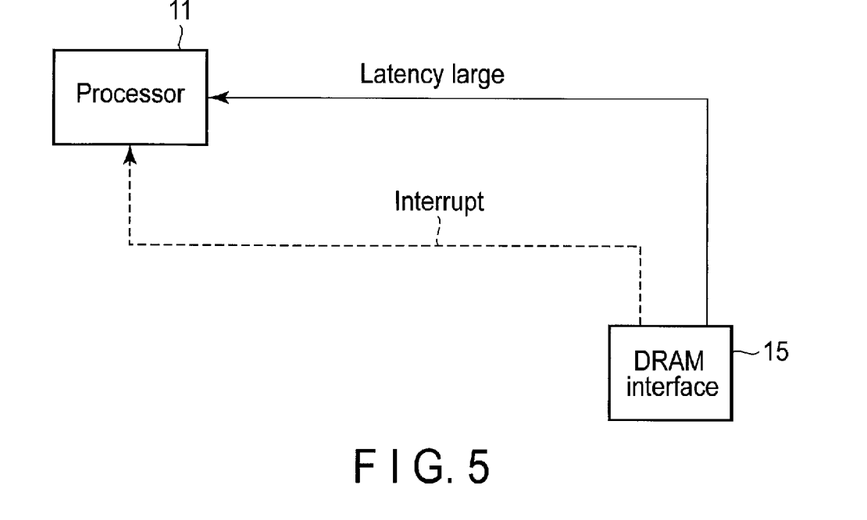
FIG. 5 is a view for explaining a first comparative example.

A first comparative example will be described below with reference to FIG. 5.

The first comparative example relates to a case where a processor 11 includes a mechanism which receives a completion notification from a DRAM interface 15. In the first comparative example, a TCM 11A tightly coupled to the processor 11 is not provided.

In the first comparative example, upon completion of processing associated with a command from the processor 11, the DRAM interface 15 notifies the processor 11 of the completion of the processing by generating an interrupt. The notification from the DRAM interface 15 to the processor 11 carried out by generating an interrupt is carried out through, for example, an INT port included in the processor 11, and is indicated by a dotted line arrow in FIG. 5. Upon receipt of this notification, the processor 11 issues a request to the DRAM interface 15 in order to execute predetermined processing (by using data prepared in the DRAM 30). When the waiting time from the time when the processor 11 requests data on the DRAM 30 from the DRAM interface 15 to the time when the processor 11 receives the data from the DRAM interface 15 is long, i.e., when the latency of a response to the request of the processor 11 from the DRAM interface 15 is large, the processor 11 is interlocked to a response waiting state during the latency, the pipeline is stopped, and the processing performance is deteriorated. Transmission/reception of a request or a response between the processor 11 and DRAM interface 15 is carried out through a bus 17, and is indicated by a solid-line arrow in FIG. 5.

If the processor 11 is not interlocked, when there is some other processing to be executed, the processor 11 can execute the processing, and hence the interlock period from the completion notification of the DRAM interface 15 to the processing completion of the processor 11 is shortened, and it becomes possible to improve the performance of the memory system 1.

Figure 6:
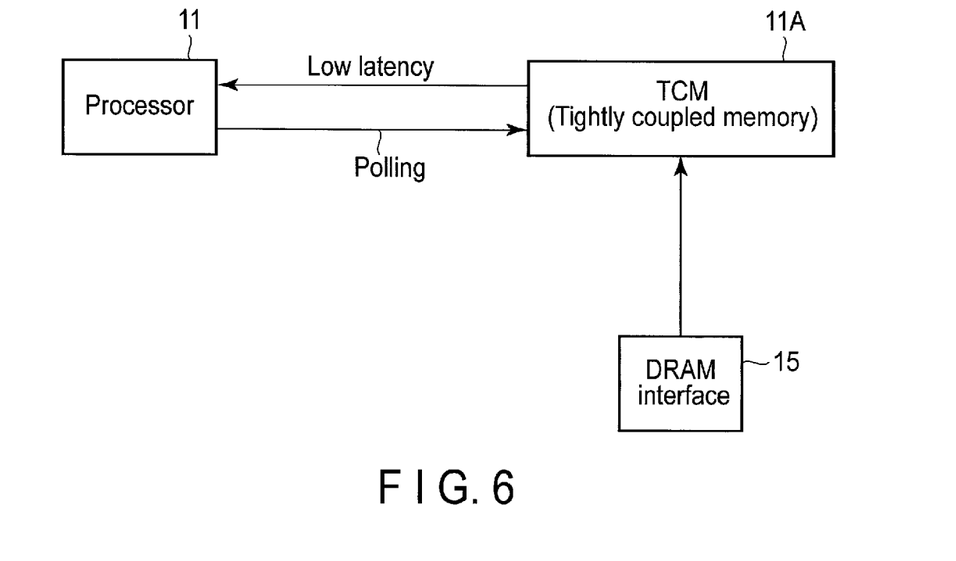
FIG. 6 is a view for explaining a second comparative example.

A second comparative example will be described below with reference to FIG. 6.

The second comparative example relates to a case where a DRAM interface 15 carries out data transfer to a TCM 11A tightly coupled to a processor 11, and writing of a completion flag to the TCM 11A, but does not carry out completion notification to the processor 11.

In comparison with the first comparative example, in the second comparative example, the processor 11 carries out processing by using data prepared in the TCM 11A which can be accessed with low latency, and hence the interlock period can be shortened. However, it is necessary for the processor 11 to monitor writing of a completion flag to the TCM 11A by executing polling and, during this period, the processor 11 cannot execute any other processing.

Further, when primarily there is no processing to be executed, until a completion flag is written to the TCM 11A, although the processor 11 seems to be able to shift to the power-saving mode owing to a pipeline stall, it is necessary for the processor 11 to execute polling, and hence the processor 11 cannot shift to the power-saving mode.

Conversely, in the controller 10 of the memory system 1 of the embodiment, during the time to receipt of a notification from the access monitoring unit 11B, the processor 11 can execute other processing, and hence it is possible to conceal the time of writing data to the TCM 11A carried out by the DRAM interface 15. Further, when there is no other processing to be executed, the processor 11 can shift to the power-saving mode, and hence reduction in power consumption of the memory system 1 can also be expected.

Figure 7:
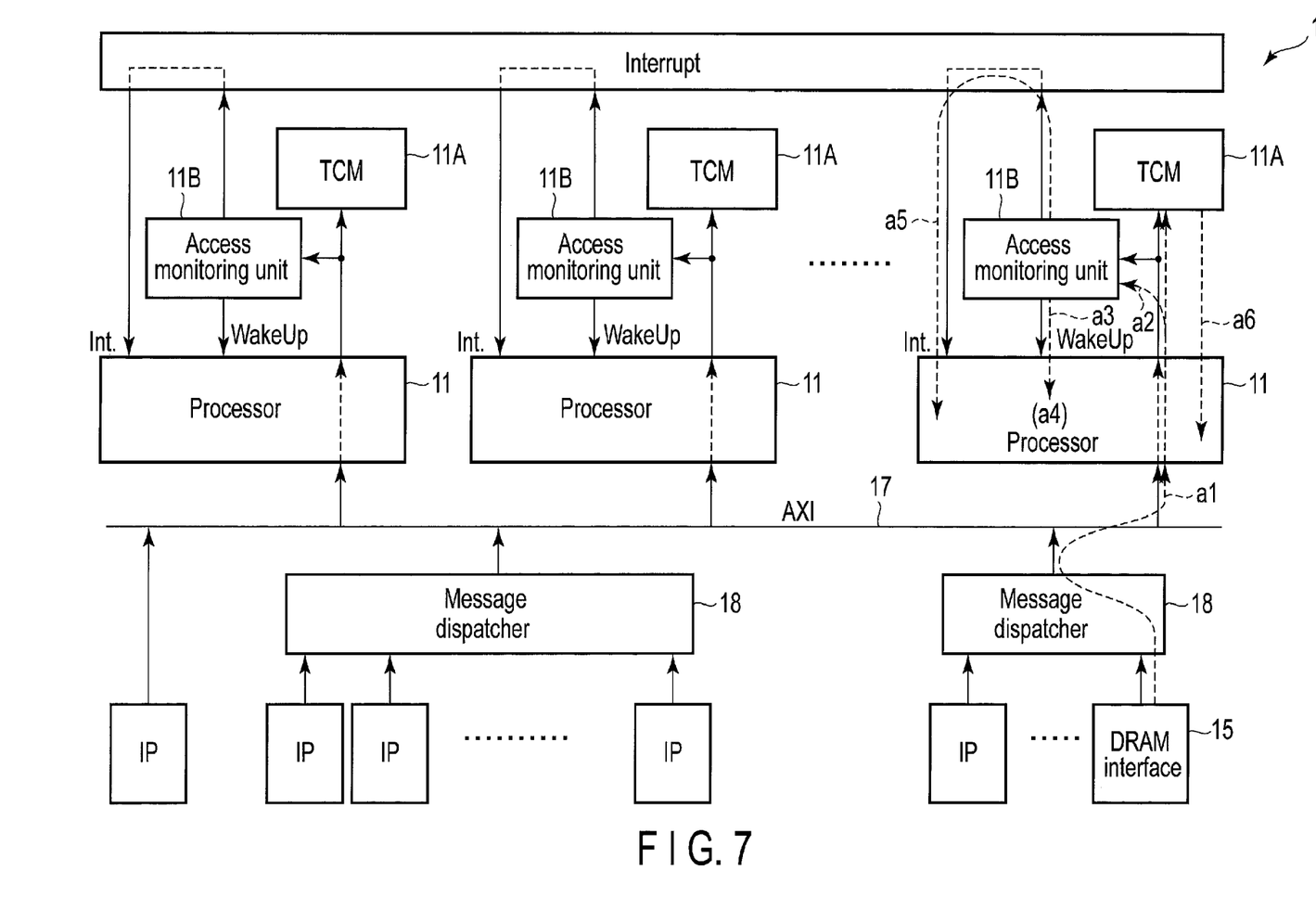
FIG. 7 is a view showing a more detailed configuration example of the controller of the memory system of the first embodiment, and is a view for explaining the cooperative operation between the processor and access monitoring unit.

FIG. 7 is a view showing a more detailed configuration example of the controller 10, and is a view for explaining the cooperative operation between the processor 11 and the access monitoring unit 11B concomitant with writing to the TCM 11A carried out by the DRAM interface 15.

As shown in FIG. 7, the controller 10 includes a plurality of combinations each of which is constituted of the processor 11, the TCM 11A, and the access monitoring unit 11B. Predetermined processing is statically assigned to each of the plurality of processors 11. The processor 11 includes a WakeUp port for accepting a notification of the recovery from the power-saving mode. Further, the processor 11 includes some INT ports in order to generate interrupts, and utilizes one of the INT ports as an interface used to accept a notification that writing to the TOM 11A has been carried out. That is, the access monitoring unit 11B switches the input value to the WakeUp port from, for example, 0 to 1 to thereby carry out notification for recovering the processor 11 from the power-saving mode to the normal mode to the processor 11, and switches the input value to the predetermined INT port from, for example, 0 to 1 to thereby carry out notification for notifying that writing to the TCM 11A has been carried out to the processor 11.

The bus 17 is an on-chip bus conforming to, for example, the Advanced Extensible Interface (AXI) specification, and an output of the DRAM interface 15 is transferred to the TCM 11A through the bus 17 by the control of a message dispatcher 18.

Upon completion of processing based on a command issued from the processor 11, the DRAM interface 15 writes a message such as a processing completion notification or the like to the TCM 11A tightly coupled to the above processor 11 (a1 in FIG. 7). The write destination of the message is set in advance at the DRAM interface 15 or at the message dispatcher 18.

Upon detection of writing to an area in the TCM 11A assigned to the DRAM interface (a2 in FIG. 7), the access monitoring unit 11B carries out notification for recovering the processor 11 from the power-saving mode to the normal mode to the processor 11 through the WakeUp port (a3 in FIG. 7). Upon receipt of this notification, the processor 11 recovers from the power-saving mode to the normal mode when the processor 11 has shifted to the power-saving mode (a4 in FIG. 7).

Further, the access monitoring unit 11B carries out notification for notifying the writing to the TCM 11A carried out by the DRAM interface 15 to the processor 11 through a predetermined INT port (a5 in FIG. 7). Upon receipt of this notification, the processor 11 executes processing using information written to the TCM 11A (a6 in FIG. 7).

Figure 8:
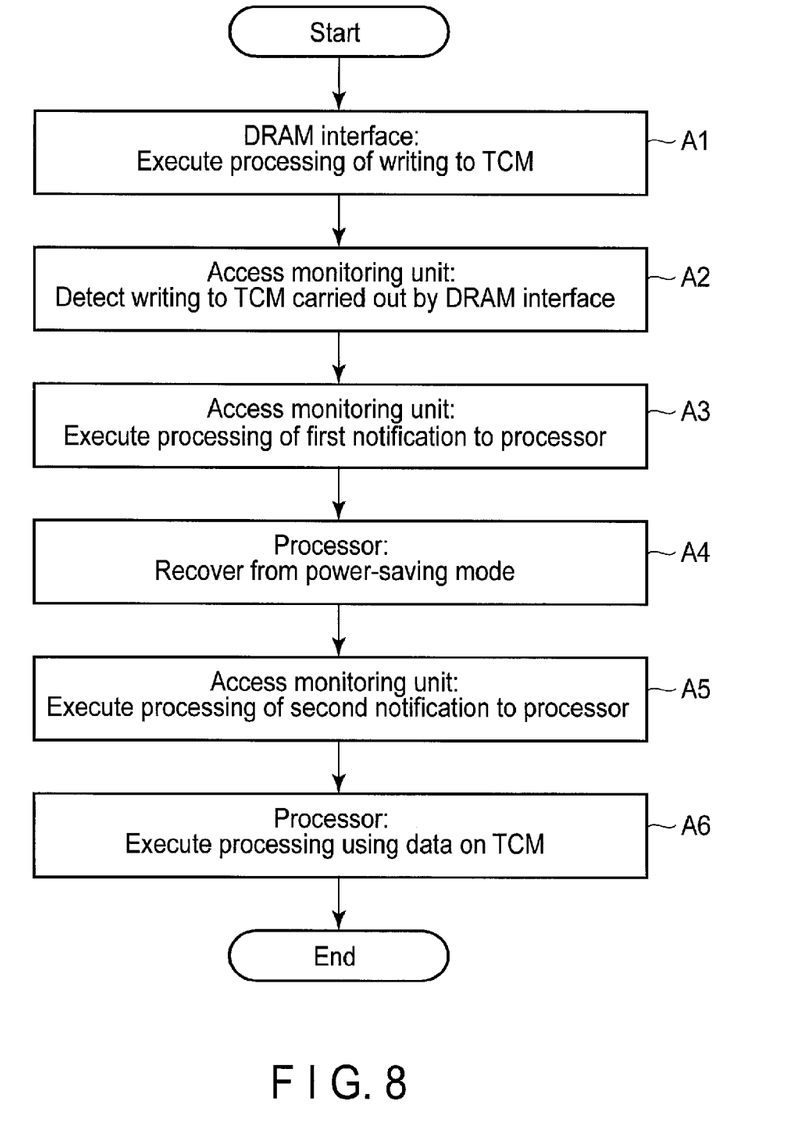
FIG. 8 is a flowchart showing an operation procedure of the controller of the memory system of the first embodiment.

FIG. 8 is a flowchart showing an operation procedure of the controller 10.

The DRAM interface 15 executes writing to the TCM 11A tightly coupled to the processor 11 which has issued a command (block A1). The access monitoring unit 11B detects the writing to the TCM 11A carried out by the DRAM interface 15 (block A2), and carries out notification (first notification) for recovering the processor 11 from the power-saving mode to the normal mode to the processor 11 (block A3). The processor 11 which has received this notification recovers from the power-saving mode to the normal mode (block A4).

Further, the access monitoring unit 11B carries out notification (second notification) for notifying the writing to the TCM 11A carried out by the DRAM interface 15 to the processor 11 (block A5). The processor 11 which has received this notification executes processing using the data written to the TCM 11A (block A6).

As described above, in the controller 10 of the memory system 1 of the embodiment, the processor 11 and the access monitoring unit 11B cooperate with each other with respect to the writing to the TCM 11A carried out by the DRAM interface 15 in the manner described previously, whereby it is made possible for the processor 11 to execute other processing or to shift to the power-saving mode during the period from the issuance of the command to the DRAM interface 15 to the writing of a response to the command to the TCM 11A carried out by the DRAM interface 15. That is, the controller 10 of the memory system 1 of the embodiment realizes performance improvement and power-saving.

It should be noted that in the above description, a case where two types of notifications are carried out by the access monitoring unit 11B to the processor 11 has been shown. In this example, the processor 11 recovers from the power-saving mode based on one notification, and the processor 11 executes the processing using the data on the TCM 11A based on the other notification. The example is not limited to this and, for example, the processor 11 may also carry out both the recovery from the power-saving mode, and execution of the processing using the data on the TCM 11A based on one notification from the access monitoring unit 11B. Furthermore, for example, in the case of a specification specifying that the processor 11 which has issued a command should not shift to the power-saving mode even when there is no other processing to be executed until a response to the command is obtained, the notification from the access monitoring unit 11B to the processor 11 can be limited to only one notification for notifying the write to the TCM 11A.

Second Embodiment

Next, a second embodiment will be described.

Figure 9:
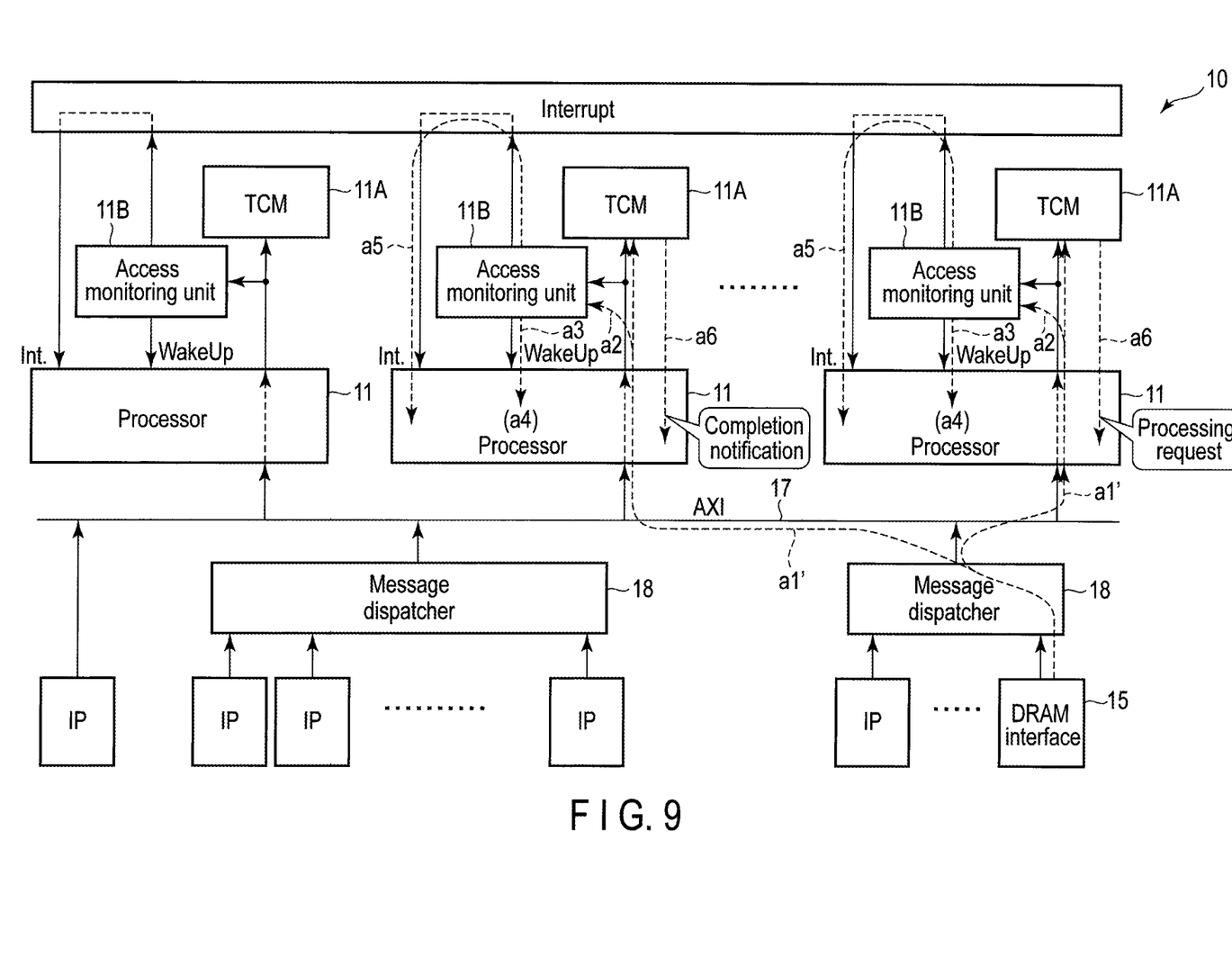
FIG. 9 is a view showing an operation procedure of a controller in a memory system of a second embodiment.

FIG. 9 is a view showing an operation procedure of a controller 10 in a memory system 1 of the embodiment, and is a view showing an example in which a DRAM interface 15 carries out identical write to a plurality of TCMs 11A.

As described previously, predetermined processing is statically assigned to each of a plurality of processors 11. In the controller 10, bucket-brigade processing is carried out among the plurality of processors 11. Here, the bucket-brigade processing implies processing to be executed by assigning a part of a series of processing to each of the plurality of processors 11, and is processing in which a processing result of a processor 11 executing processing of a former stage is handed over in order to a next processor 11 executing processing of a subsequent stage. The processor 11 executing the processing of the subsequent stage executes the processing of the subsequent stage by using the processing result of the processor 11 executing the processing of the former stage.

As the bucket-brigade processing in the memory system 1, for example, a case where when a read command has been issued from the host device 2, a certain processor 11 takes charge of processing of acquiring a physical position in the NAND memory 20 corresponding to the logical address of the read data, another processor 11 takes charge of processing of requesting the NAND interface 14 to read data stored at the acquired physical position, and still another processor 11 takes charge of processing of transmitting the read data to the host device 2 is conceivable. Thus, in the embodiment, the processor 11 and the access monitoring unit 11B carry out a cooperative operation (a2 to a6 in FIG. 9) identical to the cooperative operation in the first embodiment indicated by a2 to a6 in FIG. 7 and, in addition to this, the DRAM interface 15 executes writing of a response to a command to both a TCM 11A tightly coupled to a processor 11 which has issued the above command in order to execute certain processing, and TCM 11A tightly coupled to a processor 11 to which subsequent processing is assigned (a1' in FIG. 9). Here, although the DRAM interface 15 is exemplified, other IP cores in the controller 10 may be exemplified. The message write destination is set in advance at the DRAM interface 15 or at the message dispatcher 18.

For example, bucket-brigade processing in which the processor 11 among three processors 11 shown in FIG. 9, and shown at the central part executes certain predetermined processing, writes a processing result thereof to the DRAM 30, and the processor 11 shown at the right part executes the subsequent processing by using the processing result (of the processor 11 shown at the central part) written to the DRAM 30 is assumed. Further, it is assumed here that the processor 11 shown at the central part executing the above predetermined processing is in a state where the processor 11 has requested the DRAM interface 15 to write data to the DRAM 30.

The DRAM interface 15 which has completed the requested writing to the DRAM 30 writes a response message to the request to both the TCM 11A tightly coupled to the processor 11 (processor 11 at the central part) of the request source, and TCM 11A tightly coupled to the processor 11 (processor 11 at the right part) executing the subsequent processing (a1' in FIG. 9).

On the request source processor 11 (processor 11 at the central part) side, the access monitoring unit 11B detects the write (a2 in FIG. 9), and carries out notification for recovering the processor 11 from the power-saving mode to the processor 11 (a3 in FIG. 9). The processor 11 recovers from the power-saving mode to the normal mode when the processor 11 has already shifted to the power-saving mode (a4 in FIG. 9). Further, the access monitoring unit 11B carries out notification for notifying the write to the TCMs 11A to the processor 11 (a5 in FIG. 9), and the processor 11 which has received this notification acquires the information written to the TCM 11A, and refers to the acquired information (a6 in FIG. 9) to thereby recognize that the writing of data to the DRAM 30 requested by the processor 11 to be carried out by the DRAM interface 15 has been completed. That is, to the processor 11 (processor 11 at the central part) of the request source, the information written to the TCM 11A corresponds to a completion notification.

On the other hand, on the subsequent processing executing processor 11 (processor at the right part) side too, the access monitoring unit 11B detects the write to the TCM 11A carried out by the DRAM interface 15 (a2 in FIG. 9), and carries out notification for recovering the processor 11 from the power-saving mode to the processor 11 (a3 in FIG. 9). The processor 11 recovers from the power-saving mode to the normal mode when the processor 11 has already shifted to the power-saving mode (a4 in FIG. 9). Further, the access monitoring unit 11B carries out notification for notifying the write to the TCM 11A to the processor 11 (a5 in FIG. 9), and the processor 11 which has received this notification acquires the information written to the TCM 11A, and refers to the acquired information (a6 in FIG. 9) to thereby recognize that the processor 11 should begin to execute the processing of its own. That is, to the processor 11 (processor 11 at the right part) executing the subsequent processing, the information written to the TCM 11A corresponds to a processing request.

The cooperative operation between the processor 11 and access monitoring unit 11B on the request source processor 11 (processor 11 at the central part) side (a2 to a6 in FIG. 9), and the cooperative operation between the processor 11 and access monitoring unit 11B on the subsequent processing executing processor 11 (processor at the right part) side (a2 to a6 in FIG. 9) are executed in parallel with each other approximately at the same time due to the write (a1' in FIG. 9) to the TCMs 11A at both the central and right parts carried out by the DRAM interfaces 15 at both the parts.

As described above, in the controller 10 in which the bucket-brigade processing is carried out among the plurality of processors 11, the identical message transferred from the DRAM interface 15 to the two processors 11 becomes a processing completion notification to the one processor 11, and becomes a processing start-up request to the other processor 11. Accordingly, the labor of the communication between the processors 11 or the like is saved, and performance improvement is realized.

Third Embodiment

Next, a third embodiment will be described.

Figure 10:
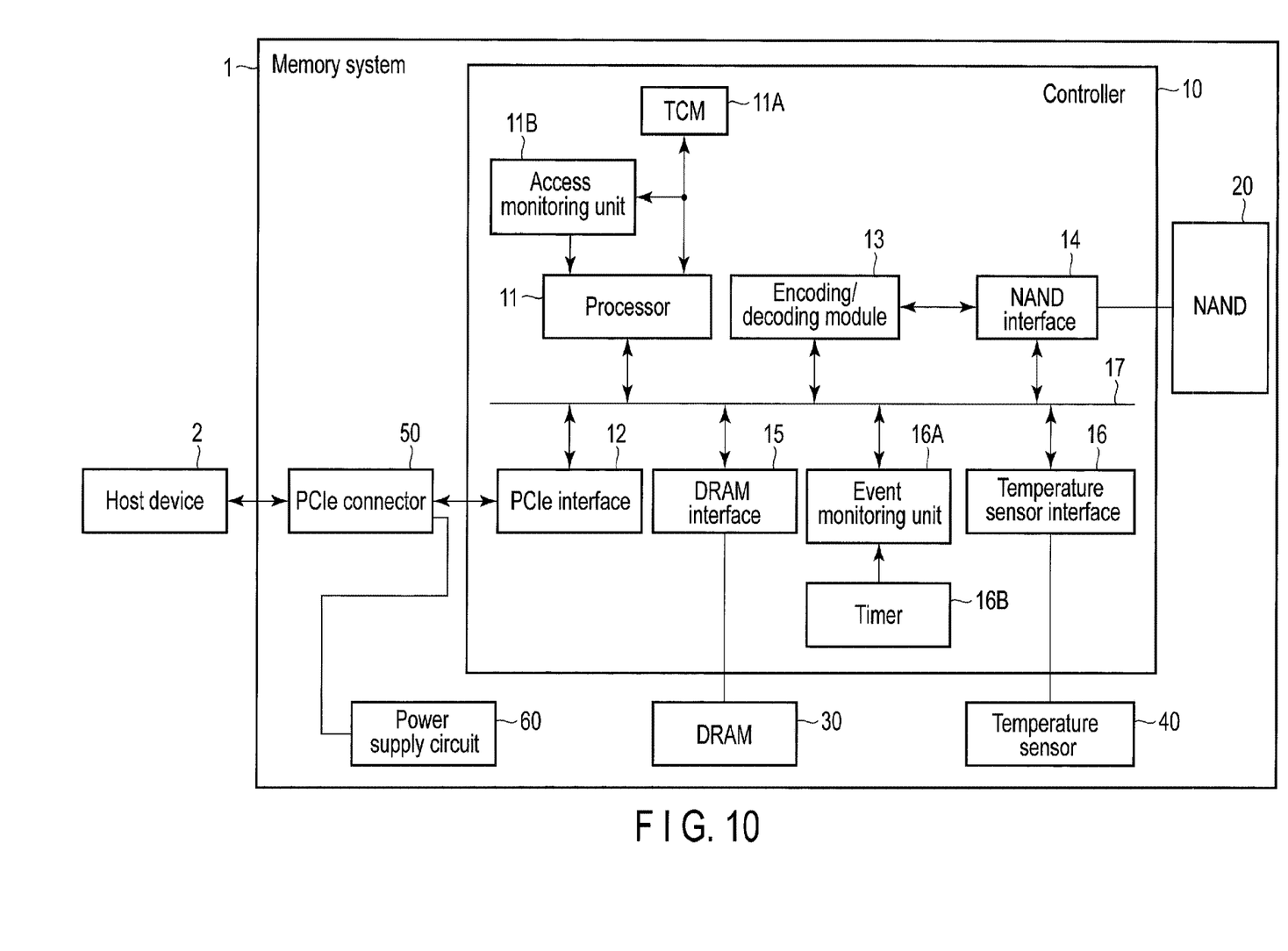
FIG. 10 is a view showing an example of a configuration of a memory system of a third embodiment.

FIG. 10 is a view showing an example of the configuration of a memory system of the embodiment.

As shown in FIG. 10, a controller 10 of a memory system 1 of the embodiment includes an event monitoring unit 16A, and a timer 16B.

As described previously, the to-be-monitored object of the access monitoring unit 11B is not limited to the DRAM interface 15, and may be other IP cores in the controller 10 such as the temperature sensor interface 16. By making write to the TCM 11A carried out by the temperature sensor interface 16 the to-be-monitored object of the access monitoring unit 11B too, when attempting to acquire temperature information of the temperature sensor 40, the processor 11 can issue a command to the temperature sensor interface 16, receive a notification from the access monitoring unit 11B, and acquire the temperature information written to the TCM 11A. In the embodiment, in place of the above, the controller 10 includes the event monitoring unit 16A, and the timer 16B, it is made unnecessary for a processor 11 to issue a command to a temperature sensor interface 16 with respect to acquisition of temperature information of a temperature sensor 40, and further performance improvement is attempted without increasing the chances for the processor 11 to receive notifications from an access monitoring unit 11B.

Figure 11:
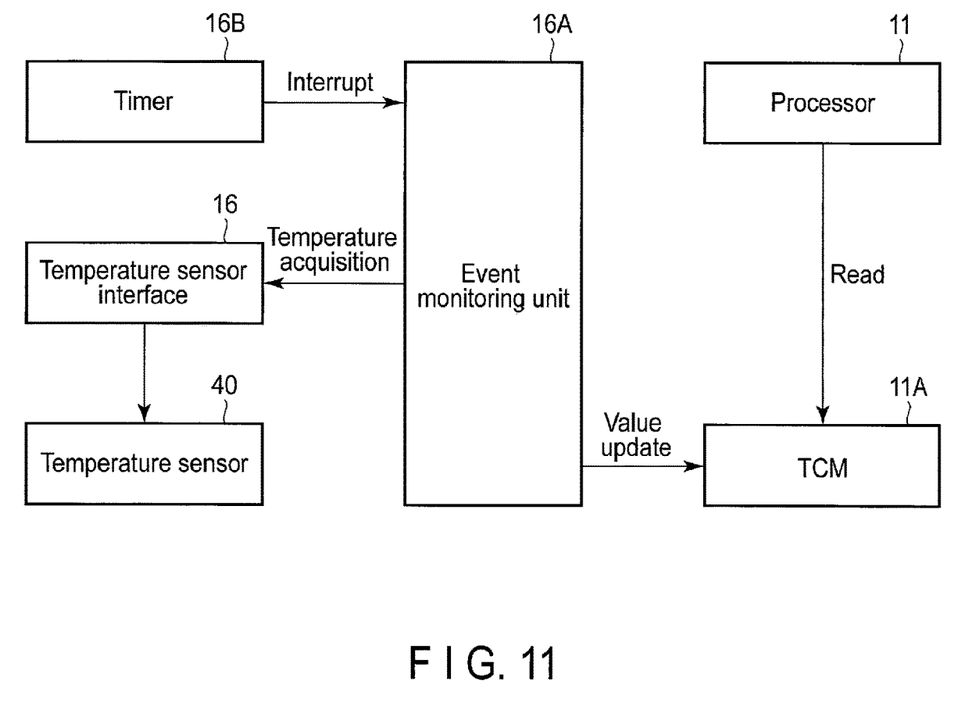
FIG. 11 is a view for explaining a principle of acquisition of temperature information by a controller in the memory system of the third embodiment.

The principle of acquisition of temperature information of the temperature sensor 40 to be carried out by the processor 11 in the embodiment will be described below with reference to FIG. 11.

The timer 16B generates interrupts on a predetermined cycle for the event monitoring unit 16A. When an interrupt occurs, the event monitoring unit 16A issues a command to acquire the temperature information of the temperature sensor 40 to the temperature sensor interface 16. The event monitoring unit 16A writes the temperature information of the temperature sensor 40 transferred thereto from the temperature sensor interface 16 to a predetermined area of the TCM 11A.

The temperature information of the temperature sensor 40 written to the TCM 11R is updated on a predetermined cycle, and hence it becomes possible for the processor 11 to acquire the temperature information of the temperature sensor 40 from the TCM 11A which can be accessed with low latency (approximately in real time), and performance improvement is realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to execute access to the nonvolatile memory based on a command from a host device,
wherein the controller comprises:
  a plurality of processors including a first processor and a second processor;
  an interface circuit configured to execute communication with an external device;
  a plurality of data memories including a first data memory and a second data memory, the first data memory being associated with the first processor, the second data memory being associated with the second processor; and
  a plurality of monitoring circuits including a first monitoring circuit and a second monitoring circuit, the first monitoring circuit being associated with the first processor and the first data memory, the second monitoring circuit being associated with the second processor and the second data memory, each of the plurality of monitoring circuits being configured to monitor writing of first data to one of the plurality of the data memories associated with the monitoring circuit by the interface circuit and to transmit a first notification to one of the plurality of the processors associated with the monitoring circuit when detecting that the writing of the first data has been completed, wherein
the interface circuit is configured to write the first data received from the external device to the first data memory and the second data memory, the first data being data corresponding to a request from the first processor to the external device to execute first processing,
the first processor is configured to recognize a completion of first processing by the first notification received from the first monitoring circuit indicating that the first data has been written to the first data memory, and
the second processor is configured to start to execute, using the first data written to the second data memory, second processing in response to the first notification received from the second monitoring circuit indicating that the first data has been written to the second data memory
wherein each of the plurality of the monitoring circuits is configured to transmit a second notification to the associated processor of the plurality of the processors after the transmission of the first notification or in parallel with the transmission of the first notification.

2. The memory system of claim 1, wherein each of the plurality of the data memories comprises a tightly coupled memory (TCM).

3. The memory system of claim 1, wherein each of the plurality of the monitoring circuits is configured to monitor the writing of the first data to the associated memory of the plurality of the data memories, which is addressed to a certain address, as the writing of the first data by the interface circuit.

4. The memory system of claim 1, wherein each of the plurality of the processors is configured to recover from a power-saving mode to a normal mode when receiving the first notification in a state of the power-saving mode.

5. The memory system of claim 1, wherein each of the plurality of the processors is configured to execute processing using the first data on the associated memory of the plurality of the data memories, which is written by the interface circuit, when receiving the second notification.

6. The memory system of claim 1, wherein each of the plurality of the processors is configured to recover from a power-saving mode to a normal mode and to execute processing using the first data on the associated memory of the plurality of the data memories, which is written by the interface circuit, when receiving the first notification in a state of the power-saving mode.

7. The memory system of claim 1, wherein:
the second notification is input to an interrupt port of the associated processor of the plurality of the processors; and
the first notification is input to a wakeup port of the associated processor of the plurality of the processors.

8. The memory system of claim 1 wherein the first notification is input to a wakeup port of the associated processor of the plurality of the processors.

9. The memory system of claim 1, wherein the interface circuit is configured to write the first data in response to a request from the plurality of the processors.

10. The memory system of claim 9, wherein each of the plurality of the processors is configured to execute processing using the first data on the associated memory of the plurality of the data memories, which is written by the interface circuit, when receiving, the first notification.

11. The memory system of claim 1, wherein
the first processing includes acquiring address conversion information to convert a logical address, which is designated by the host device to associate with user data, to a physical address of the nonvolatile memory in which the user data is stored,
the first data includes the address conversion information, and
the second processing includes reading the user data based on the address conversion information written to the second data memory.

12. A controller comprising: a plurality of processors including a first processor and a second processor; an interface circuit configured to execute communication with an external device; a plurality of data memories including a first data memory and a second data memory, the first data memory being associated with the first processor, the second data memory being associated with the second processor; and a plurality of monitoring circuits including a first monitoring circuit and a second monitoring circuit, the first monitoring circuit being associated with the first processor and the first data memory, the second monitoring circuit being associated with the second processor and the second data memory, each of the plurality of monitoring circuits being configured to monitor writing of first data to one of the plurality of the data memories associated with the monitoring circuit by the interface circuit and to transmit a first notification to one of the plurality of the processors being associated with the monitoring circuit when detecting that the writing of the first data has been completed, wherein the interface circuit is configured to write the first data received from the external device to the first data memory and the second data memory, the first data being data corresponding to a request from the first processor executing first processing to the external device, the first processor is configured to recognize a completion of first processing by the first notification received from the first monitoring circuit indicating that the first data has been written to the first data memory, and the second processor is configured to start to execute, using the first data written to the second data memory, second processing in response to the first notification received from the second monitoring circuit indicating that the first data has been written to the second data memory wherein each of the plurality of the monitoring circuits is configured to transmit a second notification to the associated processor of the plurality of the processors after the transmission of the first notification or in parallel with the transmission of the first notification.

13. The controller of claim 12, wherein each of the plurality of the data memories comprises a tightly coupled memory (TCM).

14. The controller of claim 12, wherein each of the plurality of the monitoring circuits is configured to monitor the writing of the first data to the associated memory of the plurality of the data memories, which is addressed to a certain address, as the writing of the first data by the interface circuit.

15. The controller of claim 12, wherein each of the plurality of the processors is configured to recover from a power-saving mode to a normal mode when receiving the first notification in a state where each of the plurality of the processors is shifted to the power-saving mode in which part of or all of functions of each of the plurality of the processors are stopped in.

16. The controller of claim 12, wherein each of the plurality of the monitoring circuits is configured to transmit a second notification to the associated processor of the plurality of the processors after the transmission of the first notification or in parallel with the transmission of the first notification.

17. The controller of claim 16, wherein each of the plurality of the processors is configured to execute processing using the first data on the associated memory of the plurality of the data memories, which is written by the interface circuit, when receiving the second notification.

18. The controller of claim 12, wherein each of the plurality of the processors is configured to recover from a power-saving mode to a normal mode and to execute processing using the first data on the associated memory of the plurality of the data memories, which is written by the interface circuit, when receiving the first notification in a state where each of the plurality of the processors is shifted to the power saving mode in which part of or all of functions of each of the plurality of the processors are stopped.

* * * * *

UNITED STATES PATENT AND TRADEMARK OFFICE
CERTIFICATE OF CORRECTION

PATENT NO.         : 10,599,208 B2                           Page 1 of 1
APPLICATION NO.    : 15/060825
DATED              : March 24, 2020
INVENTOR(S)        : Hiroyasu Nakatsuka et al.

It is certified that error appears in the above-identified patent and that said Letters Patent is hereby corrected as shown below:

On the Title Page

Item (54) and in the Specification, Column 1, Line 1 the Title is incorrect and should read:
--MEMORY SYSTEM AND CONTROLLER WITH BUCKET-BRIGADE PROCESSING--

Signed and Sealed this
Ninth Day of June, 2020

Andrei Iancu
*Director of the United States Patent and Trademark Office*